(12) United States Patent
Beyer

(10) Patent No.: US 12,325,277 B2
(45) Date of Patent: Jun. 10, 2025

(54) AIR-CONDITIONING DEVICE FOR INSTALLING ON A ROOF

(71) Applicant: TRUMA GERAETETECHNIK GMBH & CO. KG, Putzbrunn (DE)

(72) Inventor: Andreas Beyer, Putzbrunn (DE)

(73) Assignee: TRUMA GERAETETECHNIK GMBH & CO. KG, Putzbrunn (DE)

( * ) Notice: Subject to any disclaimer, the term of this patent is extended or adjusted under 35 U.S.C. 154(b) by 0 days.

(21) Appl. No.: 18/556,232

(22) PCT Filed: Feb. 28, 2022

(86) PCT No.: PCT/EP2022/000021
§ 371 (c)(1),
(2) Date: Oct. 19, 2023

(87) PCT Pub. No.: WO2022/237997
PCT Pub. Date: Nov. 17, 2022

(65) Prior Publication Data
US 2024/0227495 A1    Jul. 11, 2024

(30) Foreign Application Priority Data
May 12, 2021 (DE) .......................... 102021002510.5

(51) Int. Cl.
*B60H 1/00* (2006.01)
(52) U.S. Cl.
CPC ..... *B60H 1/00535* (2013.01); *B60H 1/00364* (2013.01); *B60H 2001/00235* (2013.01); *B60H 2001/00635* (2013.01)

(58) Field of Classification Search
CPC ............ B60H 1/00535; B60H 1/00364; B60H 2001/00235; B60H 2001/00635; F24F 2007/0025
See application file for complete search history.

(56) References Cited

U.S. PATENT DOCUMENTS

| 5,791,156 A | * | 8/1998 | Strautman | .......... B60H 1/00364 296/38 |
| 2008/0314072 A1 | | 12/2008 | Plank et al. | |

(Continued)

FOREIGN PATENT DOCUMENTS

| AU | 2012224891 B2 | 9/2012 |
| CN | 103090468 A * | 5/2013 |

(Continued)

OTHER PUBLICATIONS

CN-103090468-A Translation (Year: 2013).*
CN-112193019-A Translation (Year: 2021).*
KR-102098632-B1 Translation (Year: 2020).*

*Primary Examiner* — David J Teitelbaum
(74) *Attorney, Agent, or Firm* — McNees Wallace & Nurick LLC

(57) ABSTRACT

Example embodiments relate to an air conditioning unit for installation on a roof, including a housing, an indoor air distributor, and two frame units. The two frame units are of identical design and each have a first side and a second side. In an installed state, the two frame units are arranged between the housing and the indoor air distributor and serve as an upper frame unit and a lower frame unit, respectively. The first sides face each other, the second side of the upper frame unit faces the housing, and the second side of the lower frame unit faces the indoor air distributor.

17 Claims, 6 Drawing Sheets

(56) References Cited

U.S. PATENT DOCUMENTS

2021/0061058 A1\* 3/2021 Meda ................. B60H 1/00757
2021/0061060 A1 3/2021 Meda et al.

FOREIGN PATENT DOCUMENTS

| | | | | |
|---|---|---|---|---|
| CN | 112193019 A | \* | 1/2021 | ......... B60H 1/00507 |
| DE | 1840118 U | | 10/1961 | |
| DE | 202011003575 U1 | | 5/2011 | |
| DE | 102019212949 A1 | | 3/2021 | |
| EP | 0668475 A1 | | 8/1995 | |
| EP | 2418434 A1 | | 2/2012 | |
| EP | 3411250 B1 | | 10/2020 | |
| KR | 102098632 B1 | \* | 4/2020 | |
| WO | 2007042065 A1 | | 4/2007 | |

\* cited by examiner

AIR-CONDITIONING DEVICE FOR INSTALLING ON A ROOF

FIELD OF DISCLOSURE

The present disclosure relates to an air conditioning unit for controlling the temperature of a space, in particular for cooling the space thereof. More specifically, the air conditioning unit is configured for installation on a roof, e.g., on the roof of a vehicle (e.g. a motorhome or a caravan or travel trailer). Therefore, such an air conditioning unit is also referred to as a roof-mounted air conditioning unit.

BACKGROUND

The principle of cold generation, on which air cooling is based, by means of a cooling circuit is described, for example, in WO 2007/042065 A1. In so-called rooftop air conditioning units, which are employed in travel trailers or motorhomes, for example, the components for generating the cooling circuit (that is, fan, heat exchanger, evaporator, condenser) are mounted in a housing on the roof of the vehicle. Only an indoor air distributor is located inside the vehicle.

Rooftop air conditioning units include various stiffening members that are integrated in the housing. For attachment to the roof, the air conditioning unit is braced to the roof. This is done by bolting fastening elements in the interior of the vehicle to the stiffening members of the unit. The indoor air distributor is fastened to the fastening elements in the vehicle interior and thus below the roof. The indoor air distributor and the housing are located more particularly in an area around a recess in the roof for the exchange of air between the components in the housing and the indoor air distributor.

It is known, for example, from DE 20 2011 003 575 U1 to provide stiffening members in a so-called lower shell associated with the housing. For one thing, this stiffens the lower shell. For another, the housing is bolted to the stiffening members using two fastening elements in the vehicle interior. This braces the housing to the roof. In the air conditioning unit according to EP 3 411 250 B1, a frame is provided which is used in the roof cutout for positioning the air conditioning unit and at the same time for sealing. Further configurations of air conditioning units or air exchange devices are disclosed, for example, in DE 18 40 118 U, EP 0 668 475 A1 or EP 2 418 434 A1.

A drawback of the prior art is that the integration of the stiffening members in the lower shell is in part very complex. In most cases, a plurality of components are used, which are bolted to each other. Added to this are additional fastening elements in the vehicle interior. This large number of elements makes assembly more difficult. Moreover, care must be taken to ensure that, e.g., the bolting is carried out applying the forces required in each case.

The object of the present disclosure is therefore to propose an air conditioning unit which, in contrast to the prior art, distinguishes itself by being as simple as possible to install.

SUMMARY

The present disclosure achieves the object by an air conditioning unit for installation on a roof, including a housing, an indoor air distributor, and two frame units, the two frame units being of identical design, each frame unit having a first side and a second side, and wherein in an installed state, the two frame units are arranged between the housing and the indoor air distributor, and one frame unit serves as an upper frame unit and the other frame unit serves as a lower frame unit, and wherein in the installed state, the first sides of the two frame units face each other, and the second side of the upper frame unit faces the housing and the second side of the lower frame unit faces the indoor air distributor.

The air conditioning unit according to example embodiments thus involves a so-called roof-mounted air conditioning unit, in which the components constituting the refrigeration circuit are located in a housing on the roof of, e.g., a vehicle. Located in the space that is to be temperature-controlled by the air conditioning unit is only an indoor air distributor, by which the temperature-controlled air is introduced into the space and, preferably, the air that is to be temperature-controlled is also taken in. In the installed state, the two frame units are located between the housing—on the roof—and the indoor air distributor—below the roof—and preferably each rest directly against the roof—i.e. on the upper and lower sides respectively. The two frame units thus form the two bearing surfaces of the air conditioning unit on a roof. The two frame units are identical parts which in the mounted state have respective reversed installation positions. To this end, the frame units each have two sides, which are referred to here as first and second sides for the purpose of differentiation and which differ from one another in terms of their respective geometry. In the installed state, the two first sides face each other. The frame units stiffen the air conditioning unit in itself and brace it to the roof in the installed state. In addition, the indoor air distributor can be fastened to the lower side. Proceeding from the use for attachment to a roof, one frame unit is located above the roof and the other below the roof. This means that the second sides of the frame units face the housing and the indoor air distributor, respectively.

In one configuration, the two frame units are designed essentially as a type of flat ring. In one variant, the outer contour is rectangular here, and the corners may be rounded. In one configuration, the inner contour of the ring is also of rectangular design.

The further configurations describe parts of the geometries of the two sides of the frame units.

One configuration provides that the frame units each have an inner edge which each encloses an inner recess. The frame units thus have a kind of ring shape. In one variant, the air exchange between the housing—or, more precisely, between the refrigeration circuit generated in the housing by the components—and the indoor air distributor takes place through the inner recess. The air to be brought to the correct temperature thus moves through the inner recess from the indoor air distributor into the housing and, conversely, the temperature-controlled air moves from the housing to the indoor air distributor. In one variant, the inner edge that surrounds the inner recess has a height such that it can serve as a stop in the continuous recess in the roof when the air conditioning unit is installed. The inner edge thus abuts the roof recess, and the frame unit itself rests on the roof or against the roof under it. The inner edge thus facilitates installation.

One configuration involves that the frame units each have a plurality of mounting recesses for receiving mounting elements, and that at least one mounting recess allows an inserted mounting element to be fixed in place. The mounting elements are, for example, standardized or commonly used parts such as bolts, pins, nuts or washers. The mounting recesses are, for example, continuous recesses through which mounting elements are passed through the frame units. At least one mounting recess allows the inserted mounting element to be fixed in place. In this way, for example, some of the mounting recesses are configured for fixing an inserted mounting element in place such that, during installation of the air conditioning unit, the mounting elements are introduced into the mounting recesses—relative to the roof—prior to positioning the respective frame unit, and are held there for further assembly.

One configuration provides that the fixing is obtained by a form fit and/or a force fit between the mounting recess and the mounting element. This is accomplished, for example, by the mounting element being slightly larger than the associated mounting recess.

In an alternative or supplementary configuration, provision is made that the fixing is obtained in that a clamping hook is associated with the mounting recess. Such a clamping hook is elastically deformable, for example, so that the mounting element is inserted and then held.

Some mounting elements are thus clipped into the mounting recesses, for example. In one configuration, the clipping in is made possible in that the mounting elements have a slight oversize in relation to the mounting recesses. For example, a polygonal nut is inserted as a mounting element in a mounting recess having an equal number of corners. Due to the oversize, the nut is held firmly in the recess. In an alternative or supplementary configuration, an elastically deformable element is provided which deforms elastically during insertion of the mounting element into the mounting recess to then return to a rest position which prevents the mounting element from moving out of the mounting recess without the element deforming again. Thus, fewer elements need to be held and positioned during installation. The frame units carry the mounting elements with them, as it were. This simplifies installation.

The following configuration relates in particular to the fact that the frame units are employed using two different orientations.

For this reason, according to one configuration, at least one mounting recess is shaped as a through-recess, which has a geometry on the first side of the frame unit that differs from the geometry on the second side of the frame unit. For example, one configuration provides that a geometry of a mounting recess allows a nut to be fixed in place, for example. On the other side, this geometry is not required, since e.g. a bolt or pin is inserted from this side. Therefore, this is a through recess as part of the mounting recess. This permits the same bolted connection points to be used with the frame units. The bolted connection points allow the air conditioning unit to be braced or stiffened in itself or to the roof and, on the other hand, allow the indoor air distributor to be fastened in the interior space.

One configuration consists in that the frame units each include at least one stiffening member on at least one side. The stiffening member is required due to the forces acting because of the assembly or also due to the forces acting on the housing—e.g., an airstream.

Individual implementations of the stiffening member will be discussed below. Several configurations may also be combined with each other here, so that the frame units each include a plurality of different stiffening members.

One configuration provides that a plurality of stiffening members are provided and that the stiffening members are material accumulations having a substantially identical geometry. The stiffening members are, for example, triangular in shape, with free spaces between the individual stiffening members that also provide a certain elasticity. In one configuration, the stiffening members form a kind of labyrinth geometry. In one configuration, the labyrinth structure is formed in that triangular shapes are located opposite each other so that one corner each of a triangle is positioned between the side faces of two triangles having an inverted position. Here, the paths of the labyrinth are located between the triangles, which are formed as elevations.

An alternative or supplementary configuration involves that the stiffening member is configured as an at least partially annular enclosure of a mounting recess with webs adjoining in a star shape. In this configuration, a mounting recess is at least partly enclosed by a ring shape. The ring may be closed or implemented as a part-ring here. Individual webs extend outward in a star shape from this ring, which may also be in the form of a flat circular cylinder, for example. This serves to dissipate the forces away from the mounting recess and the mounting element located therein in the installed state.

An alternative or supplementary configuration provides that the stiffening member is configured as a crossbar (or, alternatively, referred to as a cross strut). In one configuration, the crossbar covers the area of the inner recess. In one configuration, the crossbar is located in the interior of the housing. This means that in one variant the crossbar forms an internal connection between two parallel sides of the frame unit, bridging the central recess.

One configuration consists in that the frame units each include at least one depression for a sealing component on one side. This depression allows, for example, the attachment—e.g. by adhesive bonding—of a foam element on the side facing the indoor air distributor for noise decoupling. Alternatively or supplementarily, such a foam element serves for sealing between the frame unit and the roof on which the air conditioning unit is mounted.

One configuration provides that on one side, the frame units each include at least one sealing structure which is in the form of at least one raised portion. The sealing structure prevents water from entering. Preferably, the sealing structure is located on the second side of the frame units. Particularly in the case of the upper frame unit, which is located outside the protected space of the vehicle as a result of being mounted on the roof, the sealing structure has the advantage that the ingress of water is prevented. In particular, this is to prevent water—e.g. rainwater—from entering the indoor air distributor and the interior space below the roof via the inner recess of the frame unit. In the mounted state, the sealing structure engages with the housing and thus causes the housing to be sealed off from the upper side of the roof. Below the roof, the sealing structure allows easier positioning of the indoor air distributor relative to the lower frame unit.

One configuration provides that on an outer face of the sealing structure at least one clearance surface is provided, which is open toward the outside and is preferably inclined. Such a clearance surface serves, for example, to allow condensation water from the housing to drain off and be conducted away to the outside via the clearance surface. For this reason, the clearance surface is located outside the area enclosed by the sealing structure. In one configuration, two clearance surfaces are provided, which are preferably arranged symmetrically with respect to each other. Corresponding to the arrangement of the clearance surface or surfaces, there is at least one opening for the condensate in the housing above the clearance surface or surfaces.

According to one configuration, the frame units each include at least one removable dome on one side. The domes rise from the surface of the respective side of the frame units.

They are configured in such a way that they can be removed relatively easily and without too much effort. That is, they are narrow, for example, or have a predetermined breaking point. In one configuration, the domes are located at a certain distance from the inner recess of the frame units. In one configuration, the frame units each have at least two domes that are located at different distances from the inner recess with increasing spacing. In one configuration, these domes serve as stop surfaces or stop components in larger roof recesses. Thus, in one configuration, the inner edge around the inner recess acts as a stop surface for a first size of recess in the roof on which the air conditioning unit is to be installed. The domes are located further outward. Therefore, they can be used if the recess in the roof is larger. For installation in the case of a smaller recess, the domes are preferably removed so that so that they do not rest on any part.

As an alternative or supplement, provision is made that the frame units each include at least one indicating device on one side. The indicating device is, for example, an impressed arrow and/or a lettering. The direction of indication is preferably arranged such that it can be seen through a roof cutout when the air conditioning unit is installed, thereby serving for alignment.

One configuration involves that the frame units each are one-piece injection-molded plastic components. Such injection-molded plastic components allow a large variety of shapes while having a low weight, and are usually cost-effective to manufacture.

One configuration of the air conditioning unit provides that a compressor, a condenser, an expansion device and an evaporator are arranged within the housing and form a cooling circuit. According to this configuration, all of the components for generating a cooling circuit are arranged within the housing and thus outside the space.

BRIEF DESCRIPTION OF DRAWINGS

In detail, there is a multitude of possibilities for configuring and further developing the air conditioning unit according to example embodiments. To this end, reference is made, on the one hand, to the claims dependent on claim 1 and, on the other hand, to the following description of exemplary embodiments in conjunction with the drawings, in which:

DETAILED DESCRIPTION OF EXAMPLE EMBODIMENTS

Figure 1:
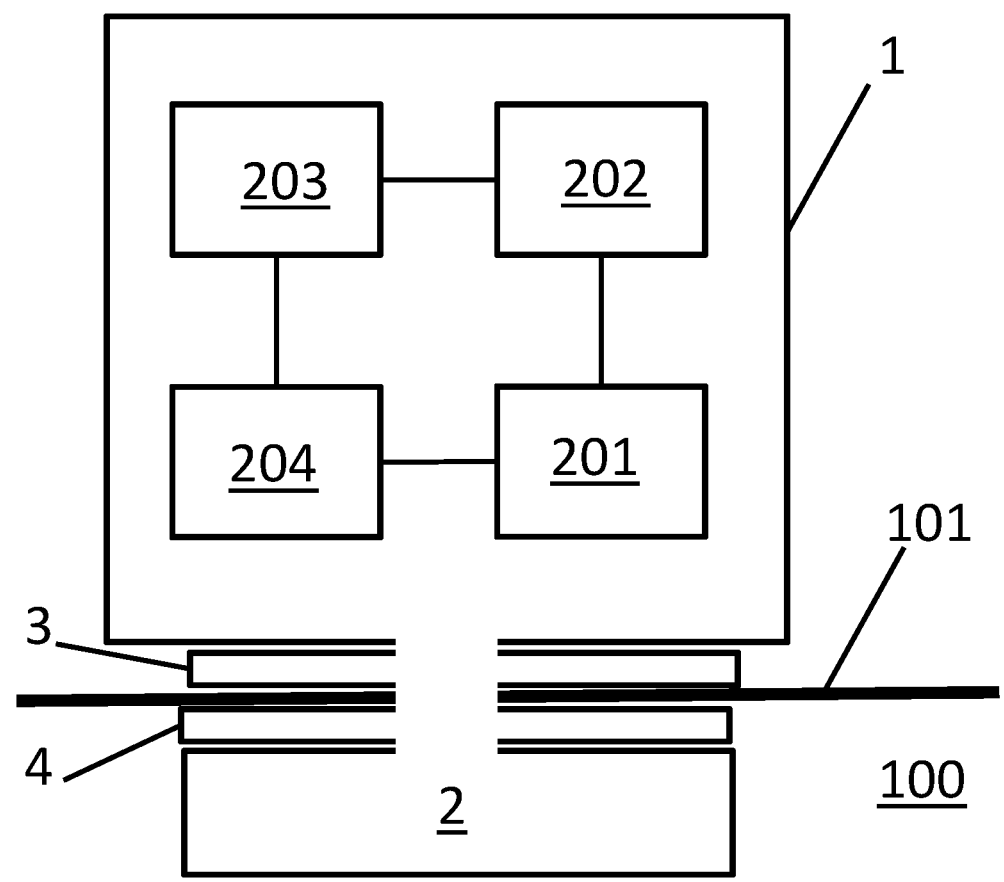
FIG. 1 shows a schematic representation of an air conditioning unit installed on a roof.

FIG. 1 schematically shows the structure of an air conditioning unit for cooling a space 100 that is located below a roof 101.

The cooling circuit or refrigeration process implemented in this way is described, for example, in WO 2007/042065 A1. In the cooling circuit, a compressor 201 compresses a gaseous refrigerant, which heats up and is transported to a condenser 202 through a refrigerant pipe. In the condenser 202, the heat of the refrigerant is given off—by means of a heat exchanger—to the ambient air (or outside air) from the surroundings around the space. The liquid refrigerant, which continues to be under high pressure, is expanded to a lower pressure in an expansion device 203, which is configured, e.g., as a throttle, causing it to cool down. In the evaporator 204, the air is cooled by means of a further heat exchanger, by the air transferring its thermal energy to the refrigerant. This causes the refrigerant to change to the gaseous state. The gaseous refrigerant finally returns to the compressor 201 so that the cooling cycle can continue. The circuit can also be reversed so that the device serves as a space heater.

The space 100 is, for example, the interior of a travel trailer or a motorhome. The components of the air conditioning unit for implementing the refrigeration process are located within the housing 1, which rests on the roof 101. Located within the space 100 is the indoor air distributor 2, through which air from the space 100—as air to be brought to the correct temperature—is discharged and through which the air brought to the correct temperature by the air conditioning unit is introduced into the space 100. Here, the air distributor 2 is mounted on the inside of the roof 101. A continuous ceiling recess is located between the components in the housing 1 on the roof 101 and the indoor air distributor 2 below the roof 101. The air to be brought to the correct temperature enters the housing 1 (or reaches the components located therein) through the recess, and the temperature-controlled air from the housing 1 moves through the recess into the air distributor 2. Direct contact between the housing 1 and the indoor air distributor 2 and the roof 101 takes place by means of the two frame units 3, 4.

Figure 2:
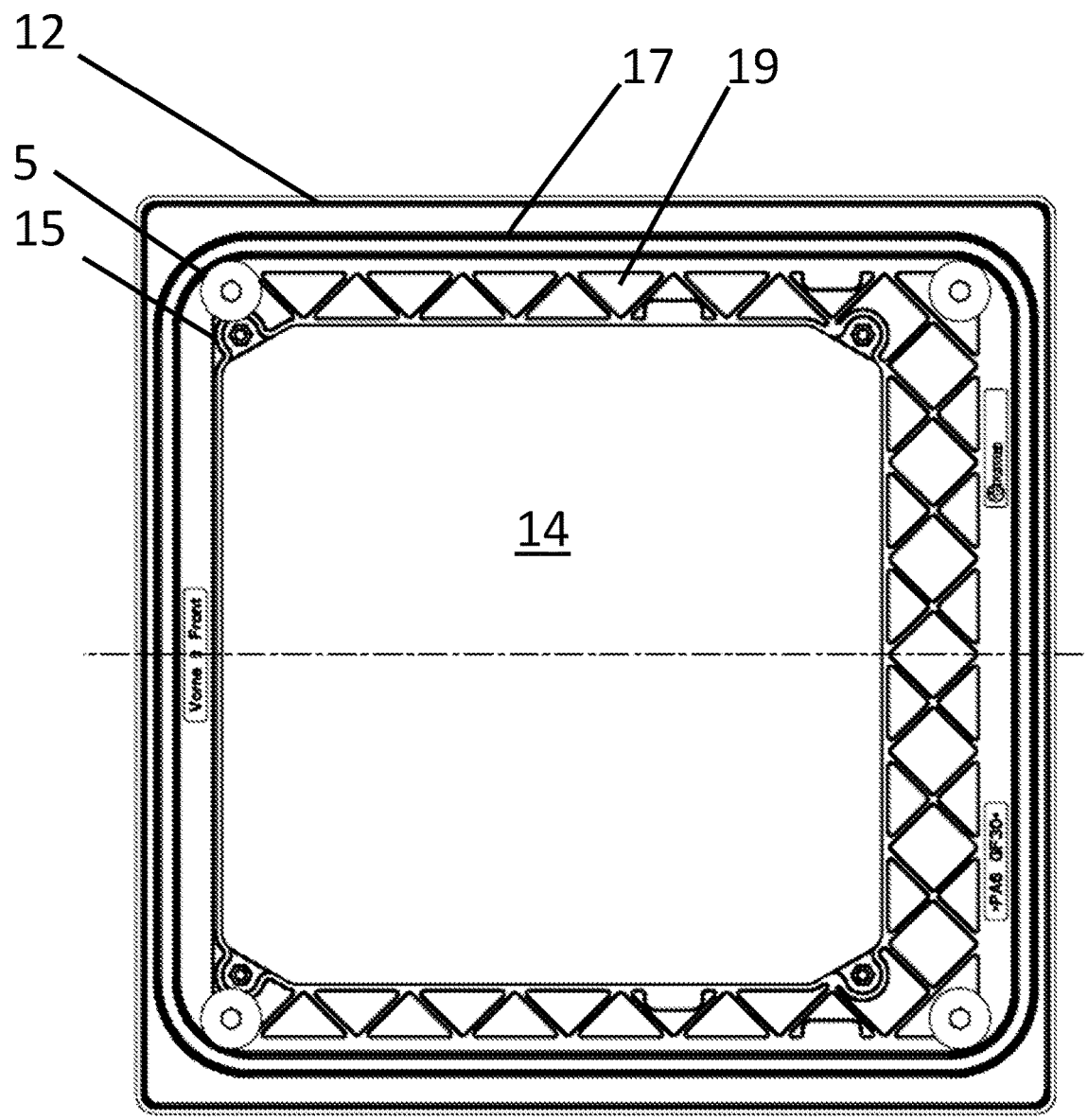
FIG. 2 shows a top view of the second side of a frame unit.

FIG. 2 shows a second side 12 of a frame unit. This second side 12 faces the housing or the indoor air distributor in the mounted state. In other words, the second side 12 each faces away from the roof.

The outer contour is rectangular and the inner recess 14 is also rectangular. The inner recess 14 is surrounded by a plurality of stiffening members 19, which consists of a number of triangles and squares. The triangles each face the inner recess 14 alternately by an apex and a base side, respectively. A continuously surrounding sealing structure 17 is provided radially further outward and serves to seal against fluid from the outside. Further radially outwardly, a depression around the sealing structure 17 can be seen, in which a sealing element is inserted in the mounted state.

Also visible are four washers that are associated with bolts in through recesses and serve as mounting elements 5. The mounting elements 5—that is, bolts, nuts, washers or pins—are common standard components that are inserted in the frame units accordingly and serve for fastening during assembly.

Figure 3:
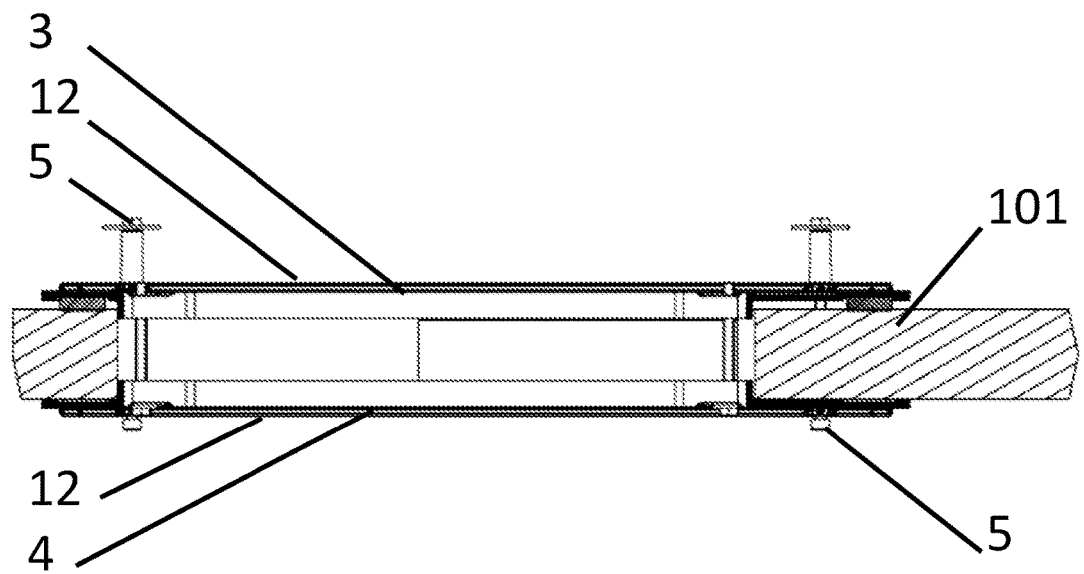
FIG. 3 shows a section taken through a portion of an installed air conditioning unit along the axis drawn in in FIG. 2.

FIG. 3 shows the section taken along the line drawn in in FIG. 2.

It can be seen how in the mounted state shown, the roof 101 is located between the two frame units 3, 4. The second sides 12 each face away from each other and also away from the roof 101. Further visible are the different mounting elements 5 which project above the plane of the frame units 3, 4 and are used for the housing or the indoor air distributor.

Figure 4:
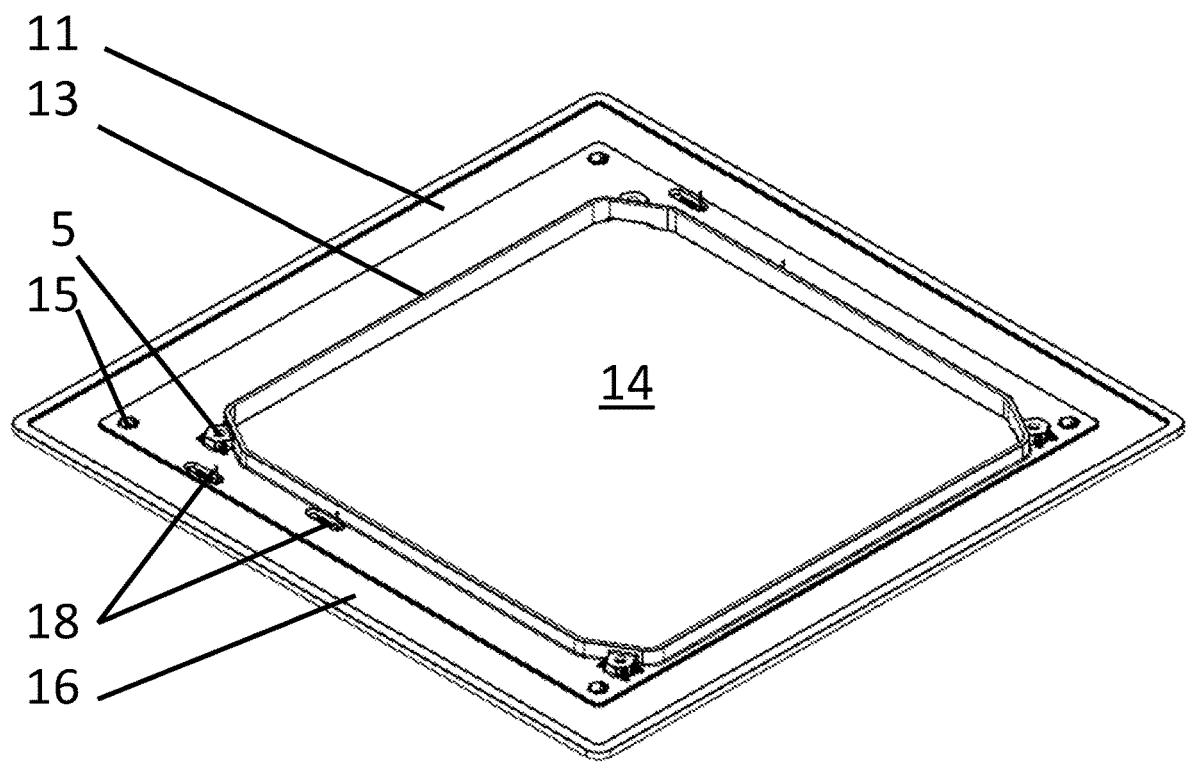
FIG. 4 shows a top view of the first side of the frame unit of FIG. 2.

FIG. 4 shows a first side 11 which, in the assembled state, rests on the roof 101 of the vehicle and clearly differs from the second side 12 of FIG. 2.

The inner recess 14 is encompassed by a raised inner edge 13, which is of such a height that it can serve as a stop surface in the roof recess. Radially further outward there are narrow domes 18 which act as stops in larger roof recesses and which, due to their narrow design, can be easily removed if required.

A depression 16 is located further radially outward, into which a sealing component or other damping component can be introduced for assembly. Located at each of the four corners in front of the depression 16 is a respective mounting recess 15, into each of which a nut can be inserted as a mounting element. The shape of the mounting recess 15 here is such that the respective mounting element 5 is captively held. These mounting recesses 15 are only implemented for the nuts on the first side 11 shown. On the opposite side, i.e. on the second side 12, there is only a through recess, since no nut is provided there as a mounting element. Furthermore, further mounting elements 5 can be seen directly on the inner edge 13.

FIGS. 5 to 9 show an alternative configuration of a frame unit. In the following, only the differences will be described.

Figure 5:
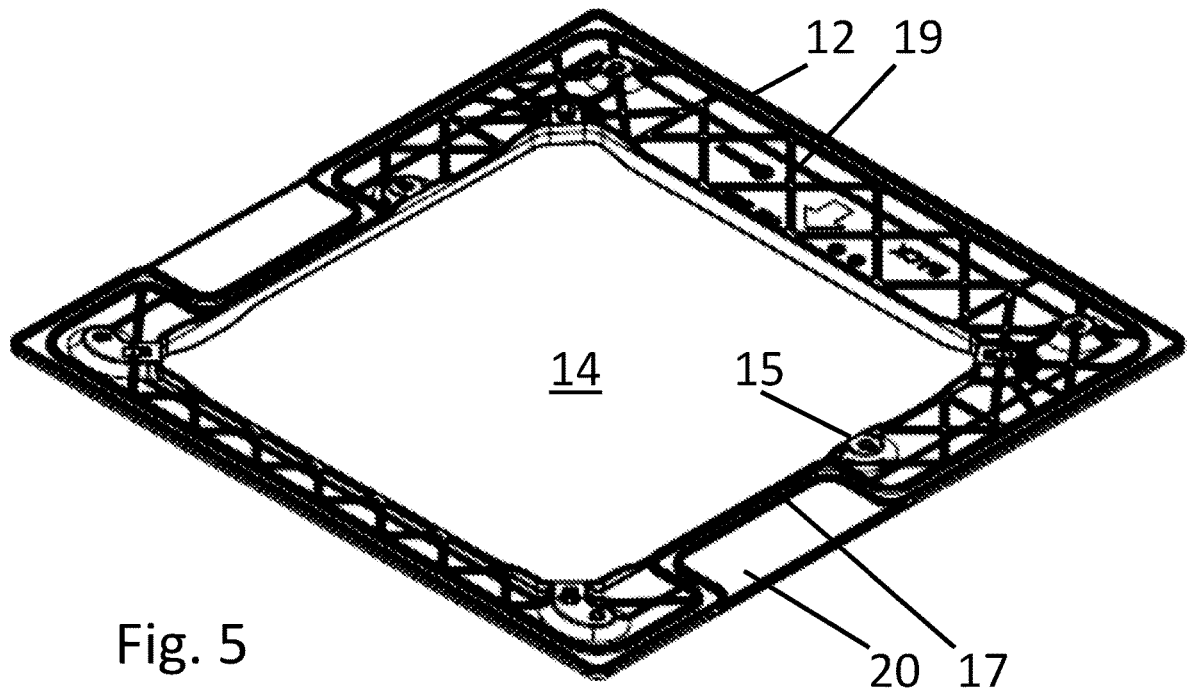
FIG. 5 shows a view of a second side of an alternative configuration of a frame unit.

On the second side 12 illustrated in FIG. 5, the stiffening members 19 are formed by struts, which each enclose triangular surfaces as well as triangular surfaces joined together to form rectangles. The sealing structure 17 has a respective recess on two symmetrically opposed sides, so that a clearance surface 20 is encompassed. The clearance surface 20 is open to the outside and is thus not surrounded by the sealing structure 17. The clearance surface 20 here is inclined to slope slightly outward so that liquid is guided to the outside. In the mounted state, the clearance surfaces 20 are each located below holes in the housing through which condensation water can drain off. The mounting recesses 15 appear as raised portions here. Here, too, the inner recess 14 is surrounded by an inner edge 13, which can be seen well in FIG. 6.

Figure 6:
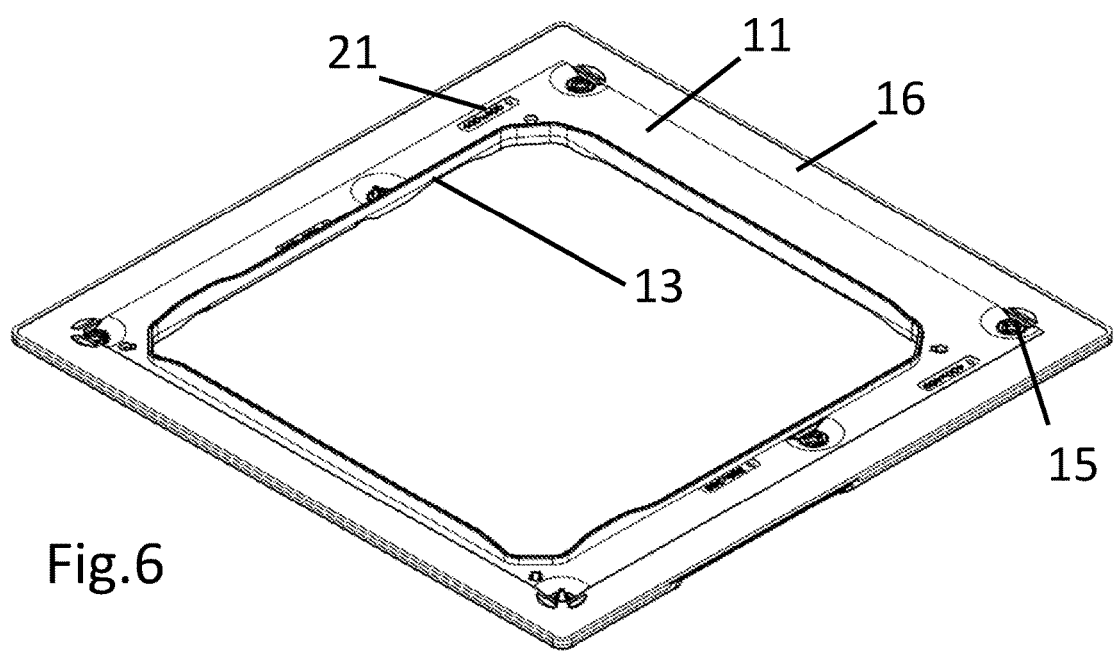
FIG. 6 shows a view of the first side of the configuration of the frame unit of FIG. 5.

On the first side 11 as shown in FIG. 6, it can be seen that there are a total of six mounting recesses 15 for mounting on the roof. The depression 16 for a sealing element surrounds the entire portion in which the mounting recesses 15 are located. Instead of the domes 18 of the configuration of FIG. 4, indicating devices 21 are provided here for mounting the frame unit in the region of a roof opening.

Figure 7:
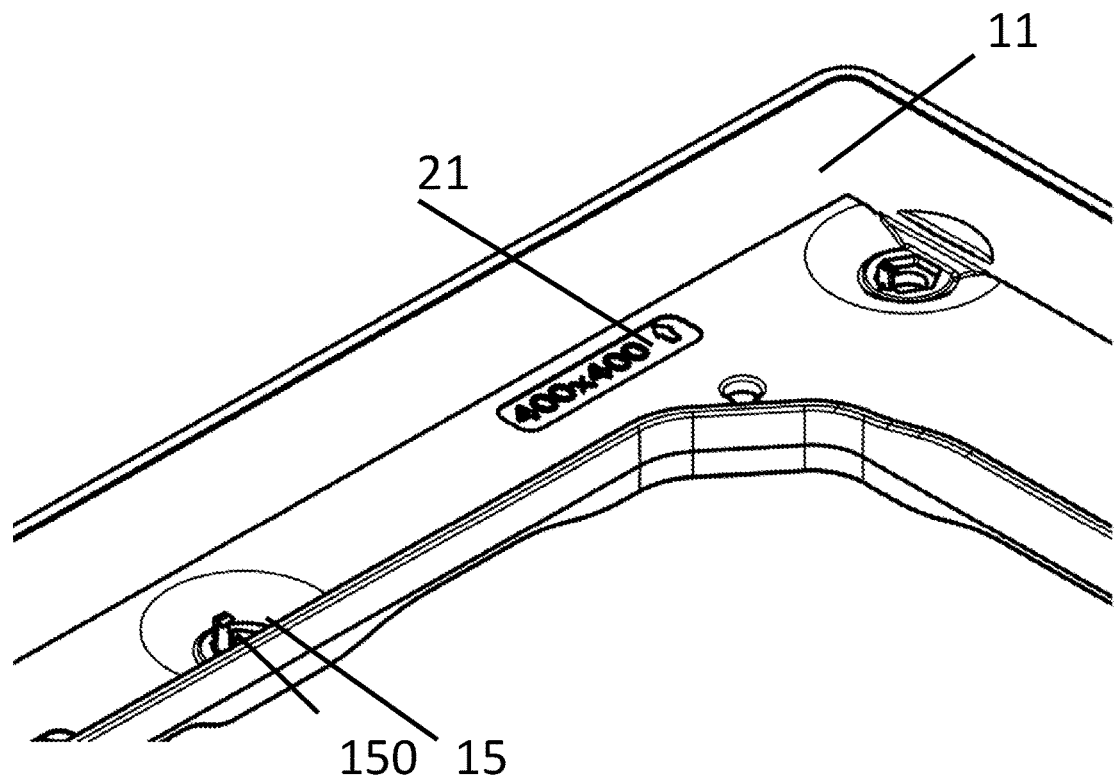
FIG. 7 shows an enlarged detail of FIG. 6.

FIG. 7 shows such an indicating device 21 on the first side 11. Here, by way of example, it involves an arrow with the indication of size of the roof cutout. The arrow here indicates the area up to which the frame unit is suitably fitted in the case of a roof cutout of the specified size. The clamping hook 150 can be seen in the mounting recess 15. If, for example, a nut is inserted in the mounting recess 15, in one configuration the clamping hook 150 is slightly bent elastically so that the nut could subsequently only fall out if a force is applied against the clamping hook 150. Alternatively or additionally, the dimensions of the mounting recess 15, the clamping hook 150 and the associated mounting element are such that the mounting element is blocked in a direction of movement (in particular in the direction of fall) by the clamping hook 150, an upper end of which here extends radially inward.

Figure 8:
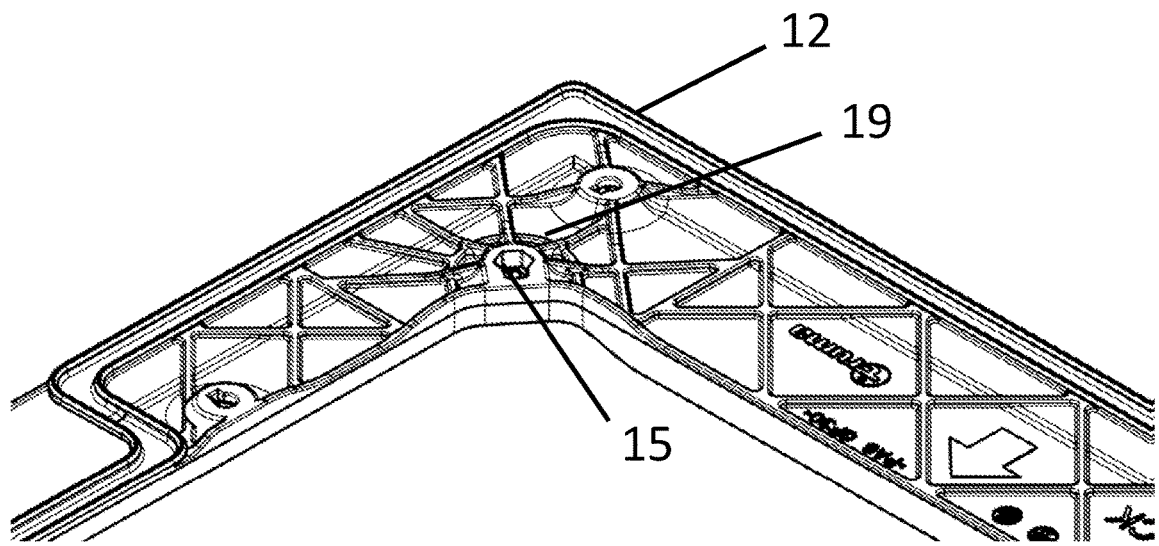
FIG. 8 shows an enlarged detail of FIG. 5.

In FIG. 8, the stiffening members 19 can be seen on the second side 12, which are arranged around a mounting recess 15 here. Starting from a partly open ring-like structure, struts extend away from the mounting recess 15 in a ray-like manner.

Figure 9:
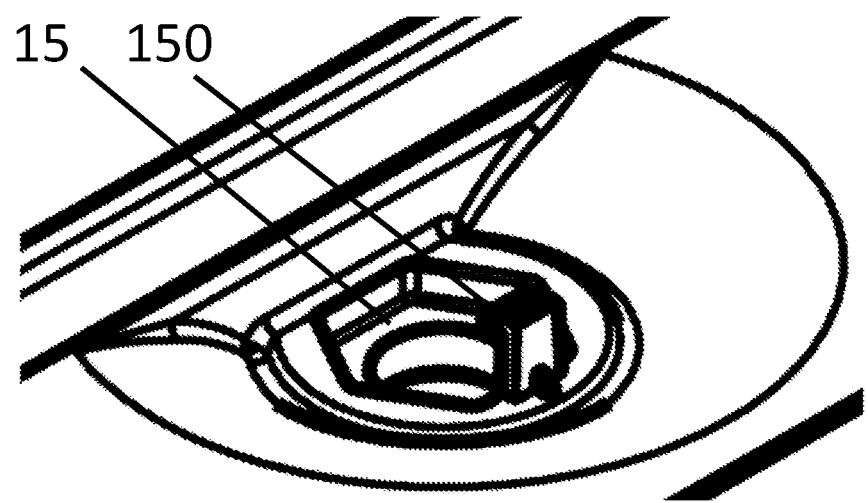
FIG. 9 shows a further enlarged detail of FIG. 7.

FIG. 9 shows a mounting recess 15 which is adjoined by a clamping hook 150. The clamping hook 150 here initially extends from the mounting recess 15 toward the side surfaces of the mounting recess 15 and protrudes inward by one end side. This prevents an inserted mounting element from falling out.

Figure 10:
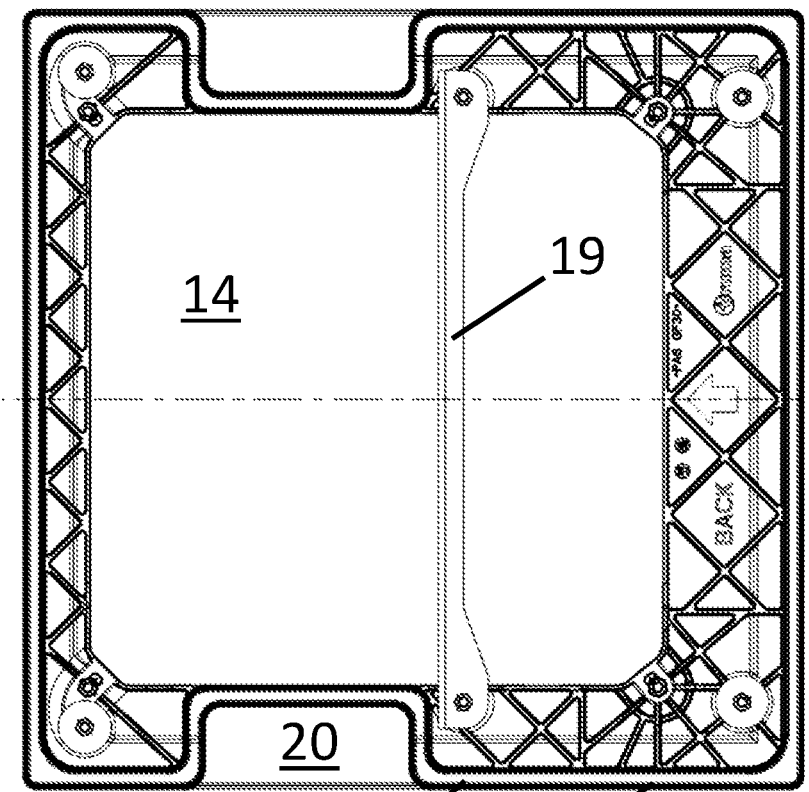
FIG. 10 shows a top view of a second side of a further configuration of the frame unit.

FIG. 10 shows, by reference to a second side 12, how the clearance surfaces 10 are located outside the sealing structure 17. Furthermore, three different stiffening members 19 can be seen. These are, for one thing, the webs forming the basic geometric shapes: here, triangles on the left-hand side and triangles and squares on the right-hand side. In addition, the mounting recesses are surrounded by the part-annular structure, which is adjoined by radiating webs. Moreover, a crossbar is also provided, which here achieves an internal stiffening across the inner recess 14. The crossbar here is located within the housing above the frame units.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

LIST OF REFERENCE NUMBERS 1 housing
2 indoor air distributor
3 upper frame unit
4 lower frame unit
5 mounting element
11 first side
12 second side
13 inner edge
14 inner recess
15 mounting recess
16 depression
17 sealing structure
18 dome
19 stiffening member
20 clearance surface
21 indicating device
100 space
101 roof
150 clamping hook
201 compressor
202 condenser
203 expansion device
204 evaporator

The invention claimed is:

1. An air conditioning unit for installation on a roof, comprising:
  a housing, an indoor air distributor, and two frame units, wherein:
  the two frame units are of identical design,
  each frame unit having a first side and a second side,
  in an installed state, the two frame units are arranged between the housing and the indoor air distributor, and one frame unit serves as an upper frame unit and the other frame unit serves as a lower frame unit, and
  in the installed state, the first sides of the two frame units face each other, and the second side of the upper frame unit faces the housing and the second side of the lower frame unit faces the indoor air distributor.

2. The air conditioning unit according to claim 1, wherein the frame units each have an inner edge which each encloses an inner recess.

3. The air conditioning unit according to claim 1,
wherein the frame units each have a plurality of mounting recesses for receiving mounting elements, and
wherein at least one mounting recess allows an inserted mounting element to be fixed in place.

4. The air conditioning unit according to claim 3, wherein the fixing is obtained by a form fit and/or force fit between the mounting recess and the mounting element.

5. The air conditioning unit according to claim 3, wherein the fixing is obtained in that a clamping hook is associated with the mounting recess.

6. The air conditioning unit according to claim 3, wherein at least one mounting recess is shaped as a through-recess, which has a geometry on the first side of the frame unit that differs from the geometry on the second side of the frame unit.

7. The air conditioning unit according to claim 1, wherein the frame units each include at least one stiffening member on at least one side.

8. The air conditioning unit according to claim 7,
wherein a plurality of stiffening members are provided, and
wherein the stiffening members are material accumulations having a substantially identical geometry.

9. The air conditioning unit according to claim 7, wherein the stiffening member is configured as an at least partially annular enclosure of a mounting recess with webs adjoining in a star shape.

10. The air conditioning unit according to claim 7, wherein the stiffening member is configured as a crossbar.

11. The air conditioning unit according to claim 1, wherein the frame units each include at least one depression for a sealing component on one side.

12. The air conditioning unit according to claim 1, wherein on one side, the frame units each include at least one sealing structure which is in the form of at least one raised portion.

13. The air conditioning unit according to claim 12, wherein on an outer face of the sealing structure at least one clearance surface is provided, which is open toward the outside.

14. The air conditioning unit according to claim 1, wherein the frame units each include at least one removable dome on one side.

15. The air conditioning unit according to claim 1, wherein on one side, the frame units each include at least one indicator.

16. The air conditioning unit according to claim 1, wherein the frame units each are one-piece injection-molded plastic components.

17. The air conditioning unit according to claim 12, wherein on an outer face of the sealing structure at least one clearance surface is provided, which is open toward the outside and inclined thereof.

* * * * *